US012686015B2

(12) United States Patent

Matsushita

(10) Patent No.: US 12,686,015 B2

(45) Date of Patent: Jul. 21, 2026

(54) BATTERY PACK WITH STRUCTURE FOR SUPPRESSING ENTRY OF CHARGED PARTICLES

(71) Applicant: TOYOTA JIDOSHA KABUSHIKI KAISHA, Toyota (JP)

(72) Inventor: Taro Matsushita, Toyokawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 322 days.

(21) Appl. No.: 18/524,674

(22) Filed: Nov. 30, 2023

(65) Prior Publication Data

US 2024/0207867 A1  Jun. 27, 2024

(30) Foreign Application Priority Data

Dec. 21, 2022 (JP) ................................. 2022-204805

(51) Int. Cl.
| | |
|---|---|
| *B03C 3/47* | (2006.01) |
| *B03C 1/035* | (2006.01) |
| *H01M 50/358* | (2021.01) |

(52) U.S. Cl.
CPC ................ *B03C 3/47* (2013.01); *B03C 1/035* (2013.01); *H01M 50/358* (2021.01); *B03C 2201/20* (2013.01)

(58) Field of Classification Search
CPC ........... H01M 50/358; B01D 2259/814; B01D 46/0034
USPC .................................................. 95/28; 96/28
See application file for complete search history.

(56) References Cited

U.S. PATENT DOCUMENTS

| | | | |
|---|---|---|---|
| 2017/0008008 A1* | 1/2017 | Umase ...................... | B03C 3/68 |
| 2022/0255184 A1* | 8/2022 | Czech ................... | H01M 50/35 |

FOREIGN PATENT DOCUMENTS

| | | | |
|---|---|---|---|
| CN | 216419781 U | | 5/2022 |
| JP | 2008-047373 A | | 2/2008 |
| JP | 2010-029740 A | | 2/2010 |
| JP | 2020113436 A | * | 7/2020 |
| JP | 2020-205135 A | | 12/2020 |
| WO | 2015/114762 A1 | | 8/2015 |

* cited by examiner

*Primary Examiner* — Jennifer Dieterle
*Assistant Examiner* — Rachel Marie Slaugovsky
(74) *Attorney, Agent, or Firm* — Oliff PLC

(57) ABSTRACT

A battery pack according to the present disclosure includes a battery cell, a case for storing the battery cell, a smoke exhaust port provided in the case, a smoke exhaust port provided outside the smoke exhaust port to form an electric field or a magnetic field outside the smoke exhaust port, and a trap device that traps charged particles by trapping the charged particles.

2 Claims, 4 Drawing Sheets

BATTERY PACK WITH STRUCTURE FOR SUPPRESSING ENTRY OF CHARGED PARTICLES

CROSS-REFERENCE TO RELATED APPLICATION

This application claims priority to Japanese Patent Application No. 2022-204805 filed on Dec. 21, 2022, incorporated herein by reference in its entirety. BACKGROUND

1. Technical Field

The present disclosure relates to a battery pack.

2. Description of Related Art

A battery pack disclosed in Japanese Unexamined Patent Application Publication No. 2008-047373 (JP 2008-047373 A) includes a magnet disposed inside a case that houses a battery cell. This magnet adsorbs magnetic substances such as iron powder, reducing the risk of short circuits between battery cells due to the iron powder and the like.

SUMMARY

In the battery pack disclosed in JP 2008-047373 A, it is difficult to suppress entry of conductive foreign matter that is not a magnetic substance. Furthermore, the magnet is disposed inside the case. Therefore, when a large amount of foreign matter enters the case, there is a possibility that the risk of short circuit between the battery cells cannot be avoided.

The present disclosure provides a battery pack that can suppress entry of conductive foreign matter into the case that houses the battery cells.

A first aspect of the present disclosure relates to a battery pack. The battery pack includes:

a battery cell;

a case for housing the battery cell;

a smoke exhaust port provided in the case; and a trap device that is provided outside the smoke exhaust port and traps a charged particle by making an electric field or a magnetic field outside the smoke exhaust port.

According to the present disclosure, it is possible to suppress entry of the conductive foreign matter into the case and reduce the risk of short circuit occurring in the battery cells.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1A:
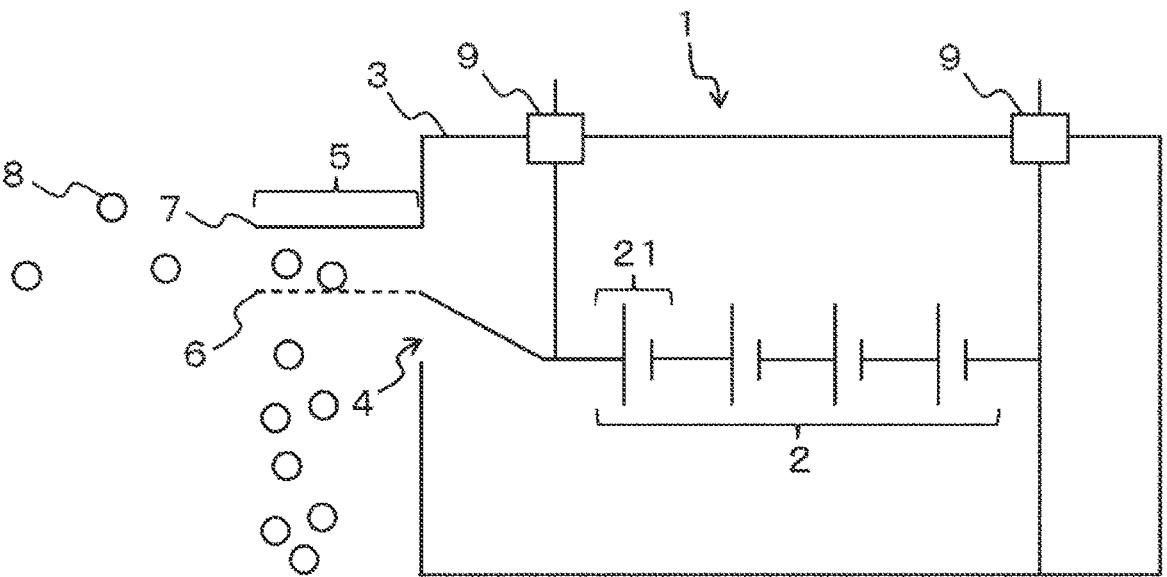
FIG. 1A shows a first embodiment of the present disclosure.

FIG. 1A shows a battery pack 1 according to a first embodiment of the present disclosure. The battery pack 1 is assumed to be used as a power source for a battery electric vehicle. The battery pack 1 is particularly suitable for a battery electric vehicle that travels on the moon. A battery pack 1 shown in FIG. 1A includes a battery cell 2, a case 3, a trap device 5, and an insulating connector 9.

The battery cell 2 is a secondary battery in which unit cells 21 are connected in series. The unit cell 21 is, for example, a lithium ion secondary battery. The battery cell 2 is housed inside a case 3. A conducting wire is connected to each terminal of the battery cell 2. Each terminal is electrically connected to an external circuit by a conductive wire. Specifically, the +terminal and − terminal of the battery cell 2 are each connected to an external circuit outside the case 3 via a conductive wire. The conductive wire connecting the battery cell 2 and the external circuit is provided with an insulating connector 9 at a portion drawn out from the case 3 so as not to interfere with the case 3. Specifically, the conductive wire passes through the inside of the insulating connector 9 and electrically connects the battery cell 2 inside the case 3 and the external circuit outside the case 3 without electrically interfering with the case 3.

In the first embodiment, the case 3 is connected to the negative terminal of the battery cell 2 by a conductive wire, and is in an electrically connected state. The conducting wire connecting the case 3 and the negative terminal of the battery cell 2 is a different conducting wire from the conducting wire drawn out from the negative terminal of the battery cell 2 to the outside of the case 3.

The case 3 has a smoke exhaust port 4 on the side surface of the case 3. The smoke exhaust port 4 is provided to release smoke to the outside of the case 3 when a malfunction occurs in the battery cell 2 inside the case 3 and smoke is emitted.

The trap device 5 includes an eave 7 provided outside the smoke exhaust port 4 and a plate 6 extending from the inside of the case 3 through the smoke exhaust port 4 to the outside of the smoke exhaust port 4. The plate 6 and the eaves 7 face each other in the vertical direction. The plate 6 is arranged below the eaves 7 in the vertical direction. The eaves 7 are either integrated with the case 3 or electrically connected to the case 3. Thereby, it is electrically connected to the negative terminal of the battery cell 2 via the case 3. The plate 6 is a lattice plate with many holes. However, the plate 6 is not limited to a grid-like one. The plate 6 may be a plate having a large number of circular holes, such as a punched metal plate. The plate 6 is electrically connected to the +terminal of the battery cell 2 within the case 3.

In this embodiment, the plate 6 corresponds to the first electrode, and the eaves 7 correspond to the second electrode. The plate 6 as the first electrode is electrically connected to the +terminal of the battery cell 2. The eaves 7 serving as the second electrode are electrically connected to the negative terminal of the battery cell 2 via the case 3. That is, the plate 6 serving as the first electrode is a positive electrode. The eave 7 as the second electrode is a negative electrode. Hereinafter, the plate 6 serving as the first electrode will be referred to as a positive electrode 6. The eaves 7 serving as the second electrode will be referred to as a negative electrode 7.

Figure 1B:
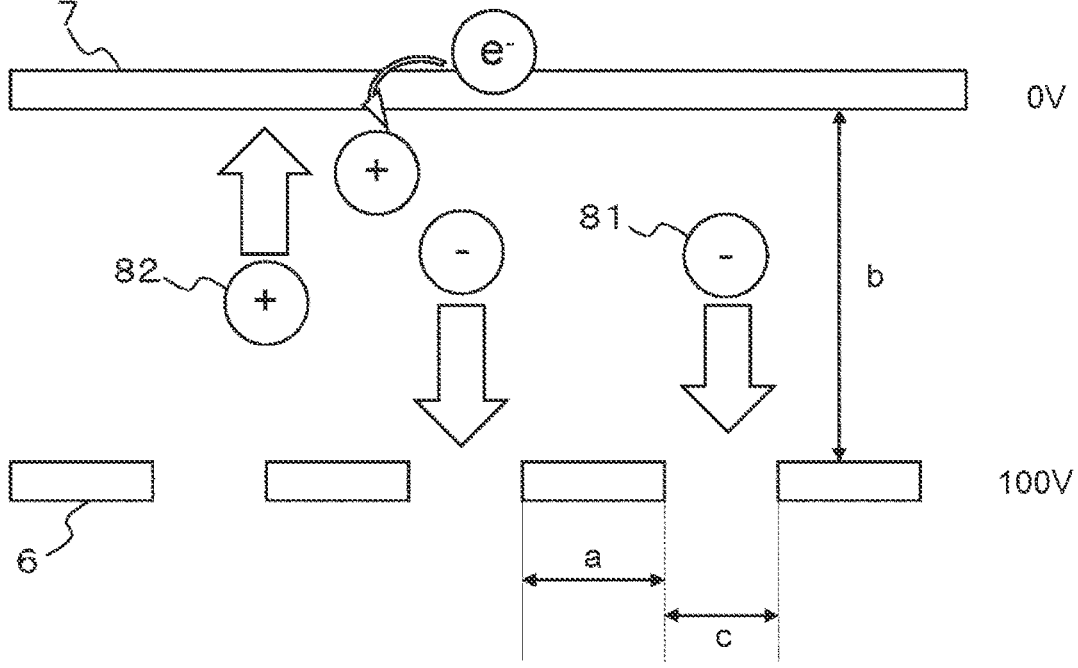
FIG. 1B shows a first embodiment of the present disclosure.

FIG. 1B shows how the trap device 5 in the first embodiment prevents foreign matter 8 from entering the case 3. The foreign matter 8 assumed here is, for example, conductive dust present on the moon surface. The foreign matter 8 includes a negatively charged foreign matter 81 and a positively charged foreign matter 82.

The positive electrode 6 attracts negatively charged foreign matter 81 and receives and receives negative charges (electrons) from the foreign matter 81. This makes the negatively charged foreign matter 81 electrically neutral. On the other hand, the negative electrode 7 attracts the positively charged foreign matter 82 and transfers negative charges (electrons) to the positively charged foreign matter 82. This makes the foreign matter 82 electrically neutral. The attracted foreign matter 81 and foreign matter 82 become electrically neutral and uncharged at the positive electrode 6 or the negative electrode 7, respectively. Therefore, the foreign matter 81 and the foreign matter 82 fall vertically downward due to gravity. In this embodiment, the direction from the negative electrode 7 to the positive electrode 6 is vertically downward. Therefore, the foreign matter 8 falls in the direction from the negative electrode 7 toward the positive electrode 6.

In the positive electrode 6 shown in FIG. 1B, the actual electrode portion with no holes and actual electrodes is designated as a. Moreover, if the electrode distance between the positive electrode 6 and the negative electrode 7 is b, it is preferable that the relationship a<b holds. According to this relationship, it is possible to effectively prevent foreign matter 8 accumulated on the positive electrode 6 from reaching the negative electrode 7.

The maximum diameter c of the hole is required to be larger than at least the maximum diameter of the foreign matter 8. Since the maximum diameter of the foreign matter 8 varies depending on the environment in which the battery pack 1 is used, the maximum diameter c of the hole in the positive electrode 6 may be changed depending on the environment in which the battery pack 1 is used.

According to the battery pack 1 disclosed in this embodiment, the vertical electric field formed by the positive electrode 6 and the negative electrode 7 that constitute the trap device 5 prevents foreign matter 8 from entering the inside of the case 3 through the smoke exhaust port 4. It is possible to prevent this.

Figure 2A:
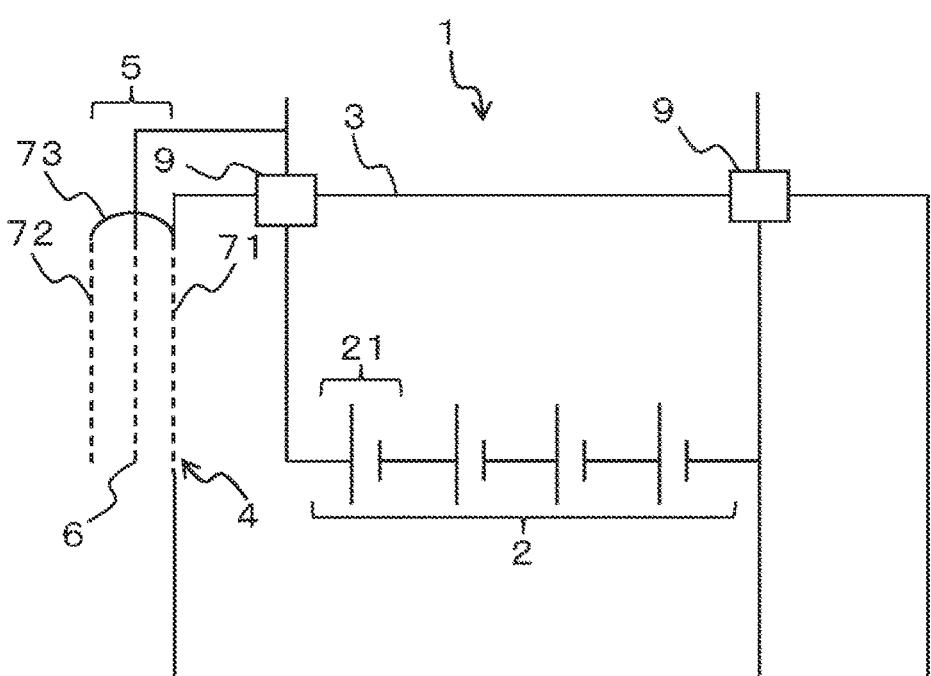
FIG. 2A shows a second embodiment of the present disclosure.
Figure 2B:
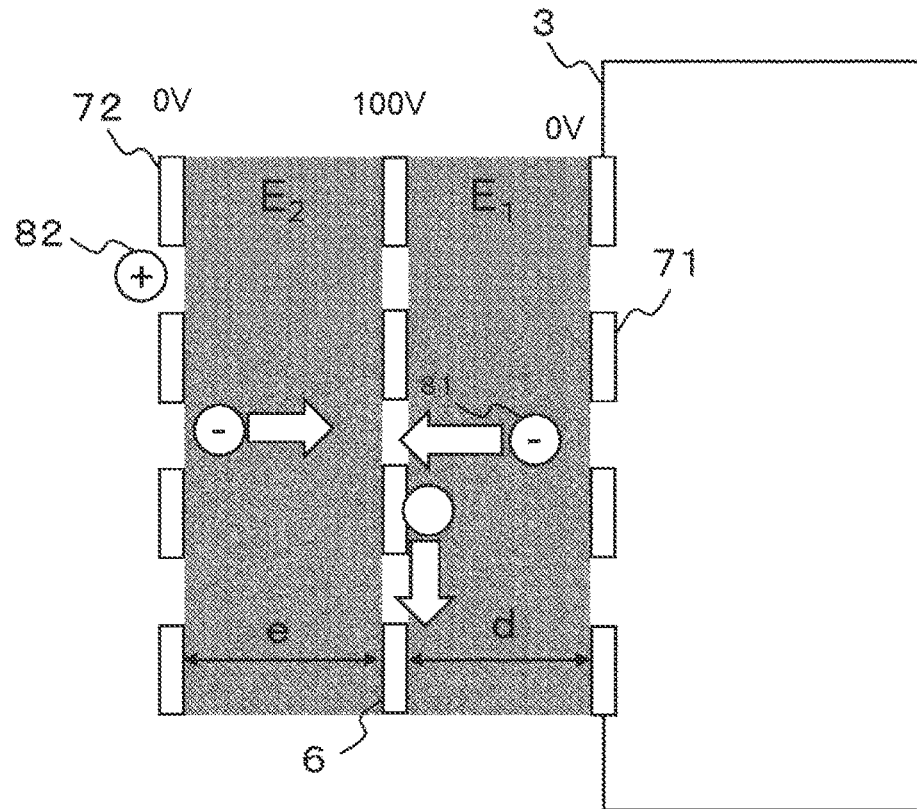
FIG. 2B shows a second embodiment of the present disclosure.

FIGS. 2A and 2B show a second embodiment of the present disclosure.

The battery pack 1 shown in FIG. 2A includes a battery cell 2, a case 3, a trap device 5, and an insulating connector 9. Also, like the first embodiment, the battery pack 1 is used for a battery electric vehicle that travels on the moon. The configurations of the battery cell 2, case 3, smoke exhaust port 4, and insulating connector 9 in this embodiment are the same as those in the first embodiment, and will not be described here.

The trap device 5 in this embodiment is provided so as to form an electric field in the horizontal direction outside the smoke exhaust port 4. Specifically, the trap device 5 includes a lid 71 provided at the smoke exhaust port, and two plates 6 and 72 that are placed in front of the lid and hang down in the vertical direction. The lid 71 and the plate 6 face each other in the horizontal direction. Further, the plate 6, and the plate 72 also face each other in the horizontal direction. The lid 71 is a grid plate with many holes. However, the lid 71 is not limited to a grid-like one, and may be a plate having a large number of circular holes, such as a punched metal plate. The lid 71 is integrated with the case 3 or electrically connected to the case 3. Thereby, it is electrically connected to the negative terminal of the battery cell 2 via the case 3. The plates 6 and 72 are lattice plates with a large number of holes. The plates 6 and 72 are also not limited to grid shapes. The plates 6, 72 may be plates with a large number of circular holes, such as punched metal. The plate 6 is electrically connected to the +terminal of the battery cell 2 by a conductor drawn out from inside the case 3. The plate 72 is electrically connected to the lid 71 by a bridge 73.

In this embodiment, the plate 6 corresponds to the first electrode, the lid 71 corresponds to the second electrode, and the plate 72 corresponds to the third electrode. The plate 6 serving as the first electrode is electrically connected to the +terminal of the battery cell 2 via a conductive wire. The lid 71 serving as the second electrode is electrically connected to the negative terminal of the battery cell 2 via the case 3. The plate 72 serving as the third electrode is electrically connected to the negative terminal of the battery cell 2 via the bridge 73 and the case 3. That is, the plate 6 serving as the first electrode is a positive electrode. The lid 71 as the second electrode and the plate 72 as the third electrode are negative electrodes. Hereinafter, the plate 6 serving as the first electrode will be referred to as a positive electrode 6. The lid 71 as the second electrode and the plate 72 as the third electrode are referred to as negative electrodes 71 and 72.

In the trap device 5, the positive electrode 6 is arranged so as to face the negative electrode 71 on a surface facing the side surface of the case 3, and to face the negative electrode 72 on the other surface. In other words, the positive electrode 6 is arranged in the opposing region where the negative electrode 71 and the negative electrode 72 face each other. By arranging the positive electrode 6, negative electrode 71, and negative electrode 72 in this manner, the trap device 5 forms an electric field in the horizontal direction.

FIG. 2B shows how the trap device 5 in the second embodiment prevents foreign matter 8 from entering the case 3. Similar to the first embodiment, the foreign matter 8 is electrically conductive and includes a negatively charged foreign matter 81 and a positively charged foreign matter 82.

The positive electrode 6 attracts negatively charged foreign matter 81. The positive electrode 6 makes the negatively charged foreign material 81 electrically neutral by transferring negative charges (electrons) from the foreign material 81. Negative electrode 71 and negative electrode 72 attract positively charged foreign matter 82. The negative electrode 71 and the negative electrode 72 transfer negative charges (electrons) to the positively charged foreign material 82 to make the foreign material 82 electrically neutral. Therefore, the foreign matter 8 becomes neutral in charge and becomes uncharged. Therefore, the foreign matter 8 falls vertically downward due to gravity.

Further, when the electrode distance between the positive electrode 6 and the negative electrode 71 is d, and the electrode distance between the positive electrode 6 and the negative electrode 72 is e, the positive electrode 6, the negative electrode 71, and the negative electrode 72 are preferably arranged such that the relationship of d<e is established between the electrode distances d and e. In this case, by satisfying d<e, the electric field E1 formed in the region where the positive electrode 6 and the negative electrode 71 face each other becomes stronger than the electric field E2 formed in the region where the positive electrode 6 and the negative electrode 72 face each other. That is, the magnitude of the force applied to the foreign matter 8 and attracted to each electrode is also larger in the electric field E1 than in the electric field E2.

For example, if a negatively charged foreign matter 81 approaches the positive electrode 6 from the electric field E2 side, passes through the positive electrode 6, and enters the electric field E1 (hereinafter, this event will be referred to as an overrun), the foreign matter 81 is pushed back toward the electric field E2 side, since the magnitude of the force in the direction of the positive electrode 6 applied to the foreign matter 81 in the electric field E2 is larger than the magnitude of the force in the direction of the positive electrode 6 applied to the foreign matter 81 in the electric field E2. Therefore, even if the foreign matter 81 overruns from the electric field E2 toward the electric field E1, the foreign matter 81 is difficult to enter into the case 3.

According to the battery pack 1 disclosed in this embodiment, entry of the foreign matter 8 inside of the case 3 is suppressed due to the horizontal electric field formed by the positive electrode 6 and the negative electrode 71 and the positive electrode 6 and the negative electrode 72 that constitute the trap device 5, respectively.

Figure 3:
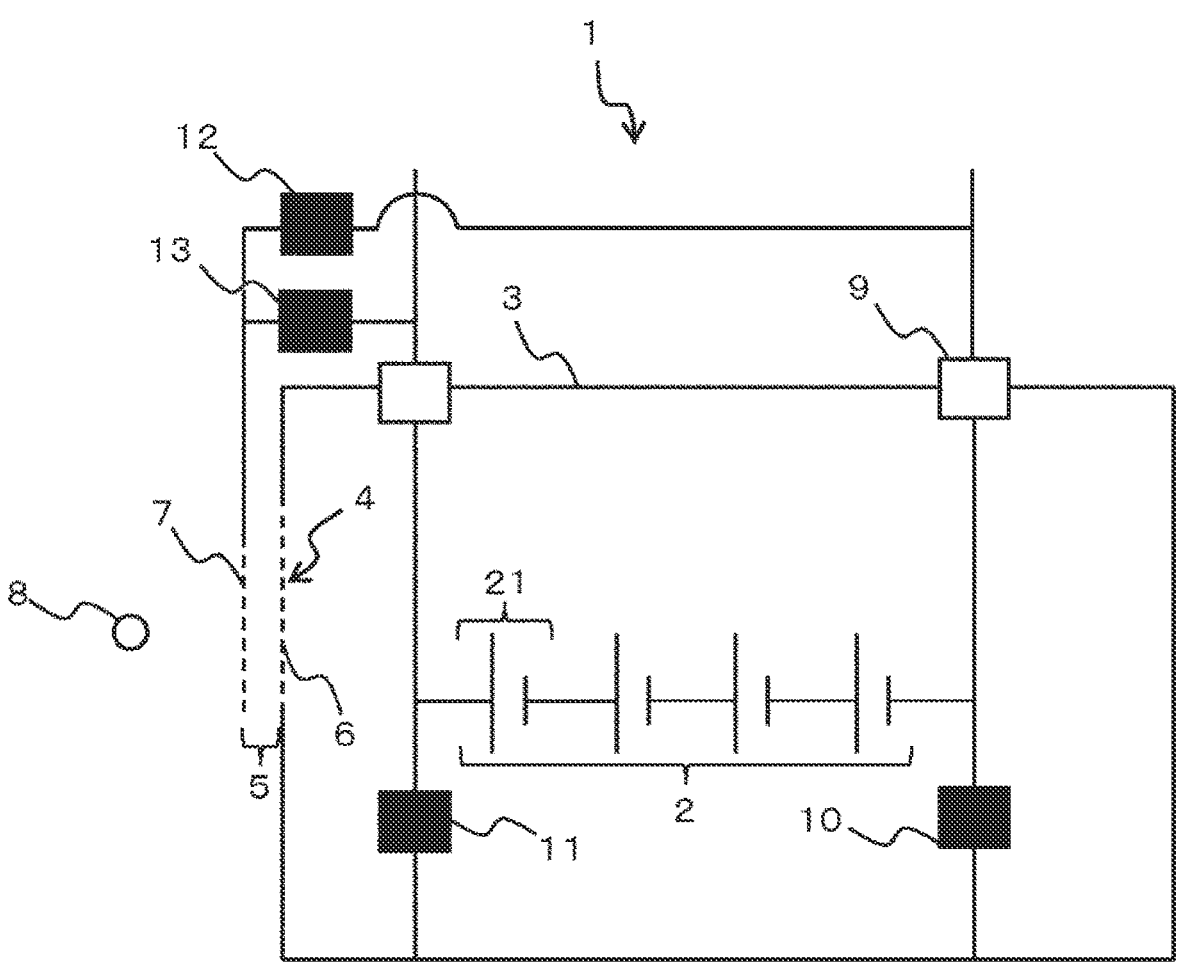
FIG. 3 shows a third embodiment of the present disclosure.

FIG. 3 shows a third embodiment of the present disclosure.

In this embodiment, the battery pack 1 includes a battery cell 2, a case 3, a trap device 5, and an insulating connector 9. Also, like the first embodiment, the battery pack 1 is used for a battery electric vehicle that travels on the moon. The battery cell 2 is housed inside a case 3. Further, each terminal is electrically connected to an external circuit. The configurations of the conductive wires and insulating connector 9 that connect the battery cells 2 and the external circuit are the same as in the first embodiment, and will not be described here.

In this embodiment, the trap device 5 includes a lid 6 provided at the smoke exhaust port, and a plate 7 placed in front of the lid and hanging down in the vertical direction. The lid 6 and the plate 7 face each other in the horizontal direction. The lid 6 is a grid plate with many holes. However, the lid 6 is not limited to a grid-like one, and may be a plate having a large number of circular holes, such as a punched metal plate. The lid 6 is integrated with the case 3 or is electrically connected to the case 3. Plate 7 is a lattice plate with many holes. The plate 7 is also not limited to a grid-like plate, and may be a plate having a large number of circular holes, such as a punched metal plate.

Further, both terminals of the battery cell 2 are electrically connected to the case 3 by conductive wires inside the case 3. Specifically, the conducting wire connected to the negative terminal of the battery cell 2 is connected to the switch 10, and the switch 10 is connected to the case 3 by the conducting wire. A conductive wire connected to the +terminal of the battery cell 2 is connected to a switch 11, and the switch 11 is connected to the case 3 by the conductive wire. That is, the − terminal and the +terminal of the battery cell 2 can be electrically connected to or insulated from the case 3 by operating the switches 10 and 11, respectively.

The conducting wire connecting the negative terminal of the battery cell 2 and the external circuit is further connected to another conducting wire, and the other conducting wire is connected to the switch 12. Switch 12 is electrically connected to plate 7. Further, the conducting wire connecting the +terminal of the battery cell 2 and the external circuit is further connected to another conducting wire, and the other conducting wire is connected to the switch 13. Switch 13 is electrically connected to plate 7. The − terminal and +terminal of the battery cell 2 can be electrically connected to or insulated from the plate 7 by operating the switches 12 and 13, respectively.

In this embodiment, the lid 6 corresponds to the first electrode, and the plate 7 corresponds to the second electrode. The plate 6 serving as the first electrode is electrically connected to the +terminal of the battery cell 2 via a conductive wire. The lid 71 serving as the second electrode is electrically connected to the negative terminal of the battery cell 2 via the case 3. The plate 72 serving as the third electrode is electrically connected to the negative terminal of the battery cell 2 via the bridge 73 and the case 3. That is, the plate 6 serving as the first electrode is a positive electrode. The lid 71 as the second electrode and the plate 72 as the third electrode are negative electrodes. Hereinafter, the plate 6 serving as the first electrode will be referred to as a positive electrode 6. The lid 71 as the second electrode and the plate 72 as the third electrode are referred to as negative electrodes 71 and 72.

In this embodiment, the lid 6 corresponds to the first electrode, and the plate 7 corresponds to the second electrode. The electrical characteristics of the lid 6 as the first electrode and the plate 7 as the second electrode can be switched by operating the switches 10 to 13. For example, when the switches 10 and 13 are turned on and the switches 11 and 12 are turned off, the lid 6 serving as the first electrode connected to the case 3 is connected to the negative electrode of the battery cell 2. Therefore, the lid 6 is negatively charged, and the plate 7 as a second electrode provided outside the case 3 is connected to the positive electrode of the battery cell 2, so it is positively charged. In this case, the trap device 5 is configured such that the lid 6 as the first electrode serves as a negative electrode, and the plate 7 as the second electrode serves as a positive electrode.

In the battery pack 1 disclosed in this embodiment, an appropriate electric field can be applied depending on the surrounding environment of the battery pack 1. For example, on the lunar surface on which the battery pack 1 is expected to be used, the polarity of the foreign matter 8 contained in the dust differs depending on whether the moon is exposed to the sun or not. The foreign matter 8 on the moon surface becomes a positively charged foreign matter 82 when the moon is exposed to the sun. When the moon is not exposed to the sun, it becomes a negatively charged foreign matter 81. Therefore, when the moon is shining on the sun, the lid 6 as the first electrode acts as a positive electrode, and the plate 7 as the second electrode acts as a negative electrode. This makes it possible to efficiently prevent foreign matter 8 from entering. Further, when the moon is not shining on the sun, the lid 6 as the first electrode acts as a negative electrode, and the plate 7 as the second electrode acts as a positive electrode. This makes it possible to efficiently prevent foreign matter 8 from entering. Such switching of the potential of each electrode may be performed using a relay circuit.

According to the battery pack 1 disclosed in this embodiment, when the polarity of the charged particles contained in the foreign matter 8 is biased, it is possible to efficiently prevent the foreign matter 8 from entering the case 3.

Figure 4A:
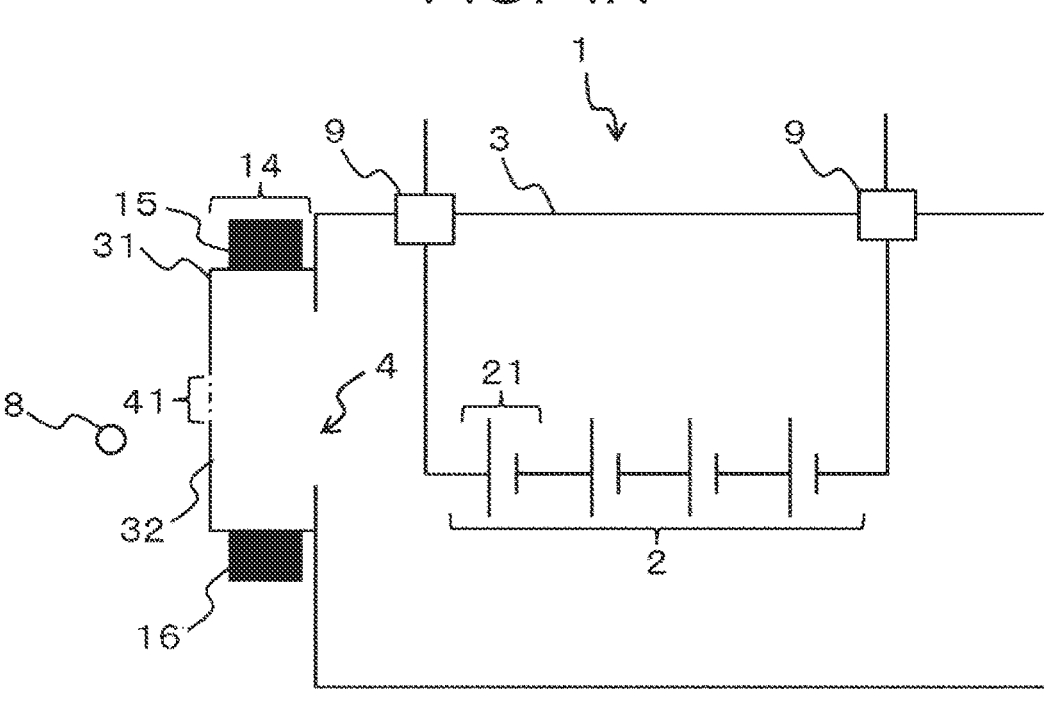
FIG. 4A shows a fourth embodiment of the present disclosure.
Figure 4B:
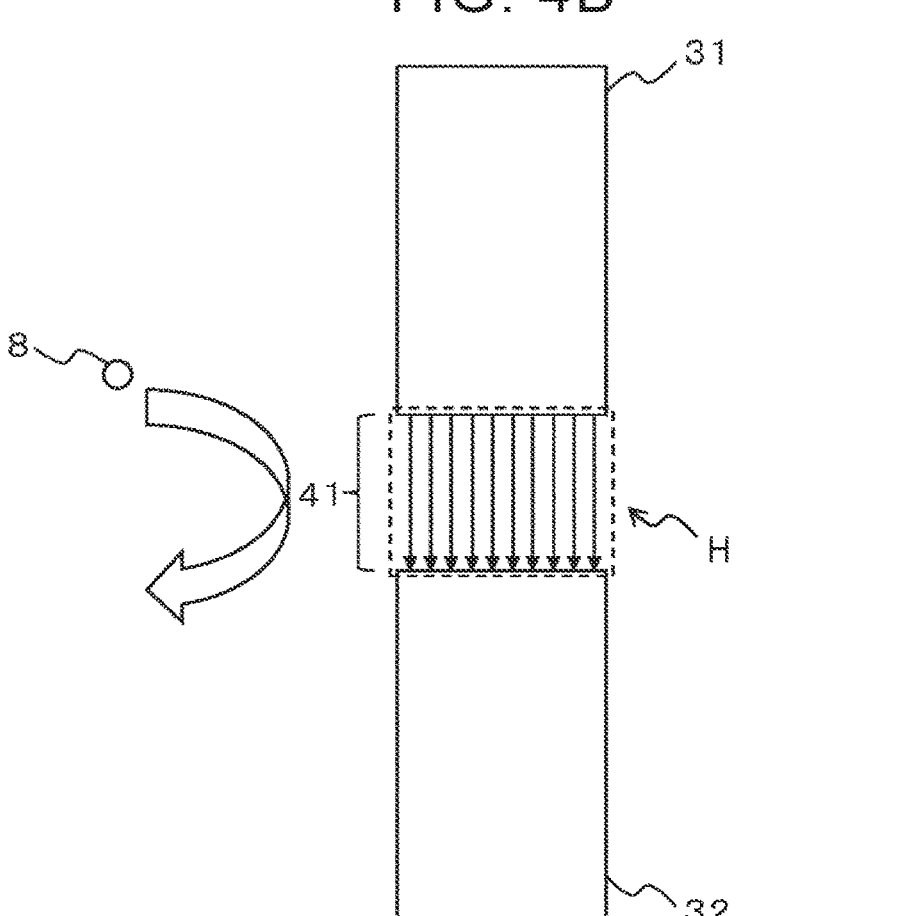
FIG. 4B shows a fourth embodiment of the present disclosure.

FIGS. 4A and 4B show a fourth embodiment of the present disclosure. First, FIG. 4A shows a schematic diagram of the battery pack 1 in this embodiment.

In this embodiment, the battery pack 1 includes a battery cell 2, a case 3, a trap device 14, and an insulating connector 9. Also, like the first embodiment, the battery pack 1 is used for a battery electric vehicle that travels on the moon.

The battery cells 2 placed inside the case 3 are electrically connected to an external circuit outside the case 3 through conducting wires connected to the +terminal and the − terminal, respectively. That is, the +terminal and − terminal of the battery cell 2 are drawn out to the outside of the case 3 by the conducting wire. Further, the conducting wire is insulated by the case 3 and the insulating connector 9. Specifically, the conductive wire passes through the inside of the insulating connector 9 and is drawn out from the inside of the case 3, so that the case 3 and the conductive wire are insulated. Moreover, the battery cell 2 is insulated from the case 3 inside the case 3.

The case 3 has a smoke exhaust port 4 on the side. The trap device 14 is provided outside the smoke exhaust port 4 so as to generate a magnetic field in the vertical direction. Specifically, the trap device 14 includes an upper magnetic body 31, a lower magnetic body 32, a magnet 15, and a magnet 16.

The upper magnetic body 31 is placed above the smoke exhaust port 4, and the lower magnetic body 32 is placed below the smoke exhaust port 4. Both side surfaces between the upper magnetic body 31 and the lower magnetic body 32 are covered with, for example, a non-magnetic member. Openings 41 are provided at the tips of the upper magnetic body 31 and the lower magnetic body 32.

The magnet 15 is attached to the upper magnetic body 31 and the magnet 16 is attached to the lower magnetic body 32. Further, the magnets 15 and 16 face each other in the vertical direction, and the magnetism of the surface of the magnet 15 facing the magnet 16 and the magnetism of the surface of the magnet 16 facing the magnet 15 are different from each other.

FIG. 4B shows a schematic diagram of the magnetic field H formed in the opening 41.

A magnetic field H extending in the vertical direction with increased magnetic flux density is formed in the opening 41 by a magnetic circuit composed of the upper magnetic body 31 and the magnet 15 and the lower magnetic body 32 and the magnet 16. The charged foreign matter 8 that attempts to enter the inside of the case 3 through the opening 41 rotates around the lines of magnetic force that constitute the magnetic field H and makes a rotational motion that advances in the direction of the lines of magnetic force. Therefore, the foreign matter 8 is repelled to the outside of the magnetic bodies 31 and 32 at the opening 41, or is caught by the lines of magnetic force, thereby losing horizontal speed and falling. This prevents foreign matter 8 from entering the case 3.

What is claimed is:

1. A battery pack comprising:
a battery cell;
a case for housing the battery cell;

a smoke exhaust port provided on a side surface of if the case, an eave being provided outside the smoke exhaust port; and
a trap device that is provided outside the smoke exhaust port and traps a charged particle by making an electric field outside the smoke exhaust port, the trap device including:
   a first electrode; and
   a second electrode that is disposed to face the first electrode and has a potential different from the first electrode;
wherein
   a late with a plurality of holes is provided in the smoke exhaust port the date extending from an inner side of the case to an outer side of the smoke exhaust port:
   the plate constitutes the first electrode by being electrically connected to one terminal of the battery cell;
   the eave constitutes the second electrode by being electrically; connected to another terminal of the battery cell; and
   an electric field in a vertical direction is made between the first electrode and the second electrode.

2. A battery pack comprising:
a battery cell;
a case for housing the battery cell;
a smoke exhaust port provided in the case; and
a trap device that is provided outside the smoke exhaust port and traps a charged particle by making an electric field outside the smoke exhaust port, the trap device including:
a first electrode; and
a second electrode that is disposed to face the first electrode and has a potential different from the first electrode,
wherein:
the smoke exhaust port is provided on a side surface of the case;
the smoke exhaust port is provided with a lid having a plurality of holes;
a plate with a plurality of holes is disposed in front of the lid, the plate hanging down in a vertical direction;
the plate constitutes the first electrode by being electrically connected to one terminal of the battery cell;
the lid constitutes the second electrode by being electrically connected to another terminal of the battery cell; and
an electric field in a horizontal direction is made between the first electrode and the second electrode.

* * * * *